United States Patent [19]

Johnson

[11] 4,314,775

[45] Feb. 9, 1982

[54] METHOD OF SITE CASTING TUNNELS, CULVERTS, PRESSURE PIPES WITH MINIMUM FORMING

[76] Inventor: Delp W. Johnson, 240 Oakview Dr., San Carlos, Calif. 94070

[21] Appl. No.: 74,084

[22] Filed: Sep. 10, 1979

[51] Int. Cl.³ ............................................. E02D 29/10
[52] U.S. Cl. .................... 405/155; 138/105; 249/11; 405/124; 425/59; 29/527.1; 29/424; 29/458
[58] Field of Search ............... 405/124, 125, 126, 155, 405/154, 149; 425/59, 63; 249/11, 12, 1, 188, 205, 207, 209; 264/333, 220, 225, 31; 138/155, 156, 157, 162, 166, 177, 178, 105

[56] References Cited

U.S. PATENT DOCUMENTS

| | | | |
|---|---|---|---|
| 1,052,198 | 2/1913 | Wyre | 405/124 X |
| 1,144,692 | 6/1915 | LaMare | 249/11 |
| 1,995,716 | 3/1935 | Millsom | 138/105 X |
| 2,005,699 | 6/1935 | Gottwald | 138/157 X |
| 2,786,255 | 3/1957 | Heeb | 249/11 |

FOREIGN PATENT DOCUMENTS 910476  6/1946  France ................................ 405/124

*Primary Examiner*—Dennis L. Taylor

[57] ABSTRACT

A method is disclosed for the construction of structures for tunnels, culverts, and pressure pipes of any size and shape, straight or curved, constant or variable cross section. The method requires very little formwork, with all work done on site. The method discloses the casting of a lower half of the structure as a continuous element, and the method of utilizing this half as a form in which modular lengths of the upper half of the structure are cast, lifted, inverted, and lowered to form the complete structure. Various methods are disclosed for joining the modules comprising the upper half of the structure to provide various degrees of structural continuity and fluid tightness.

34 Claims, 26 Drawing Figures

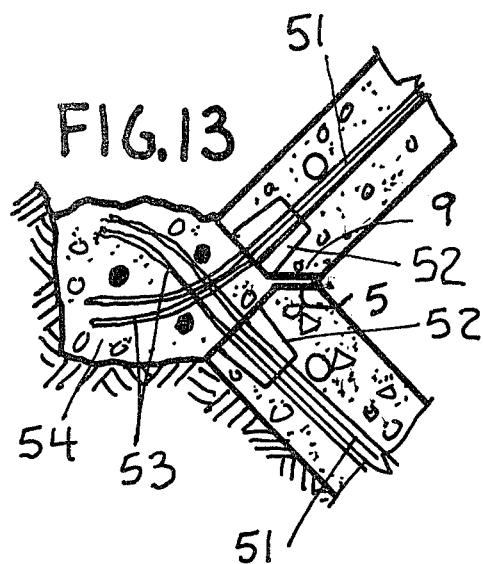
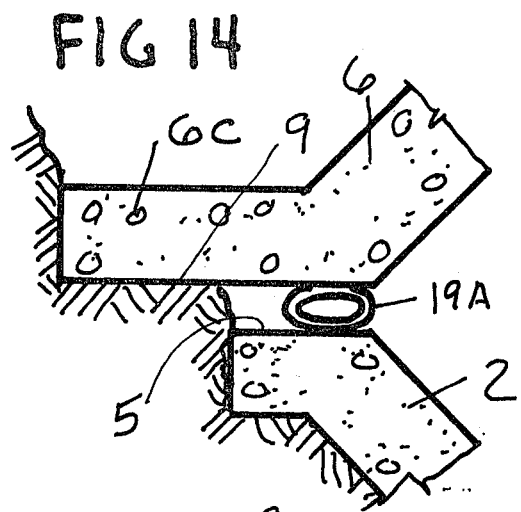
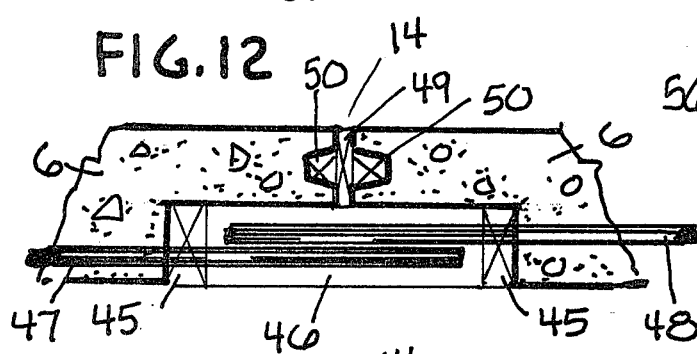
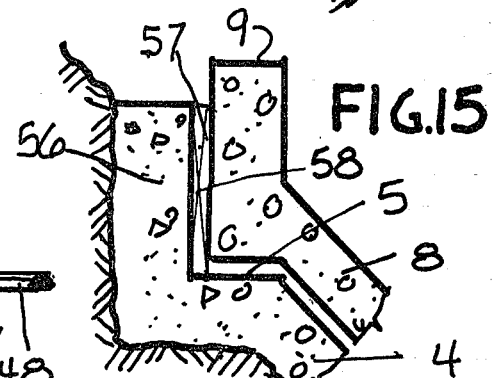
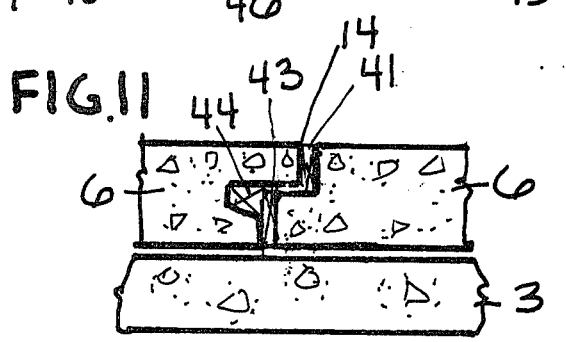
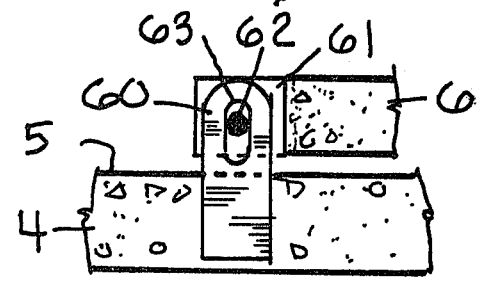
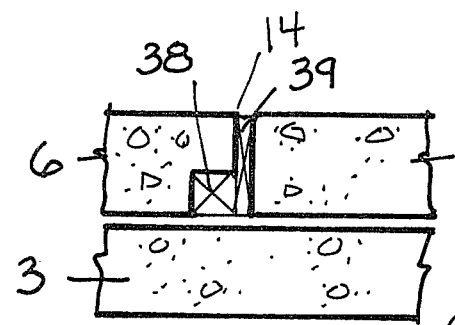
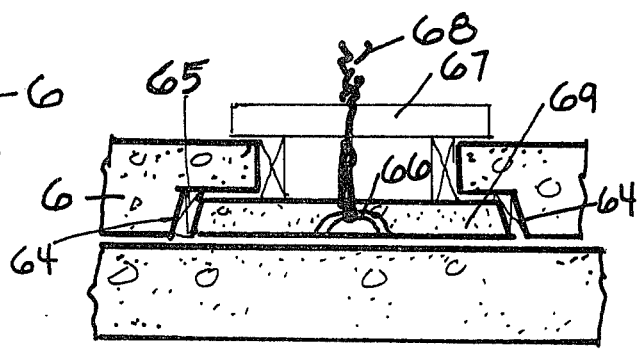

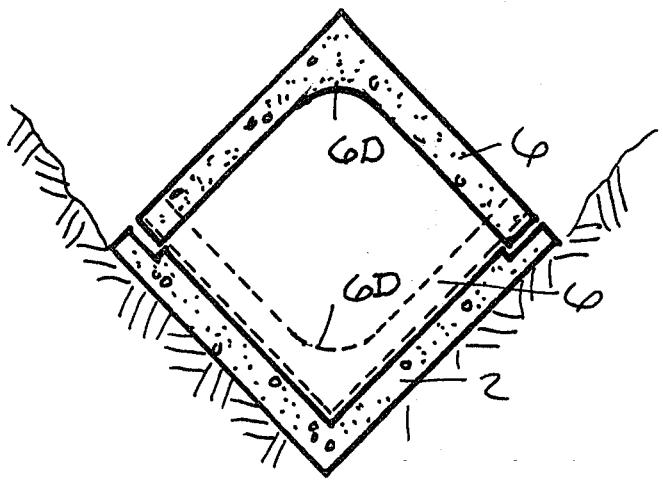
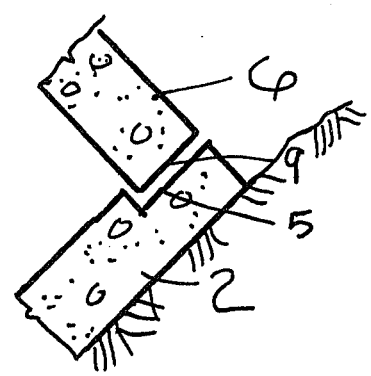
FIG 19    FIG. 18
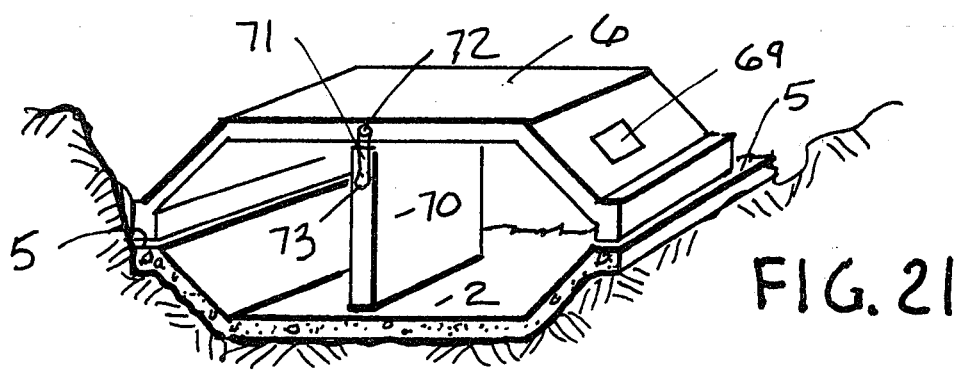
FIG. 21
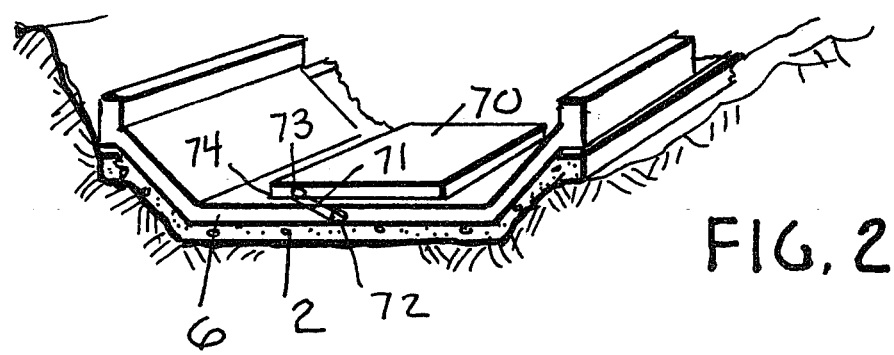
FIG. 20

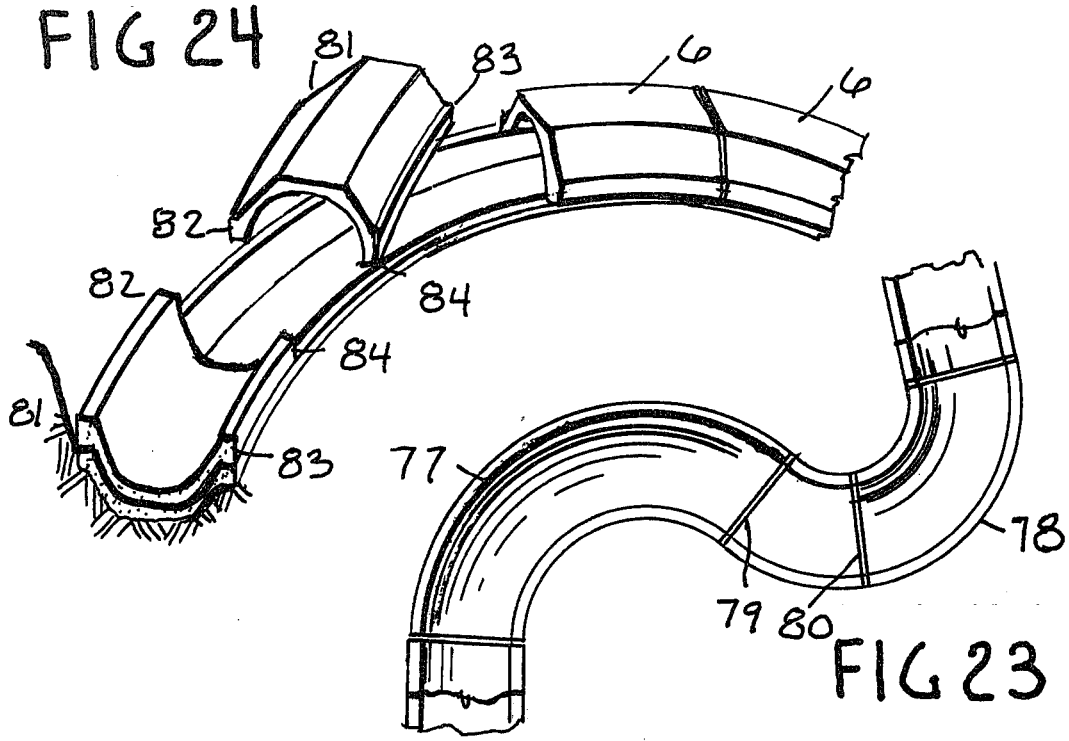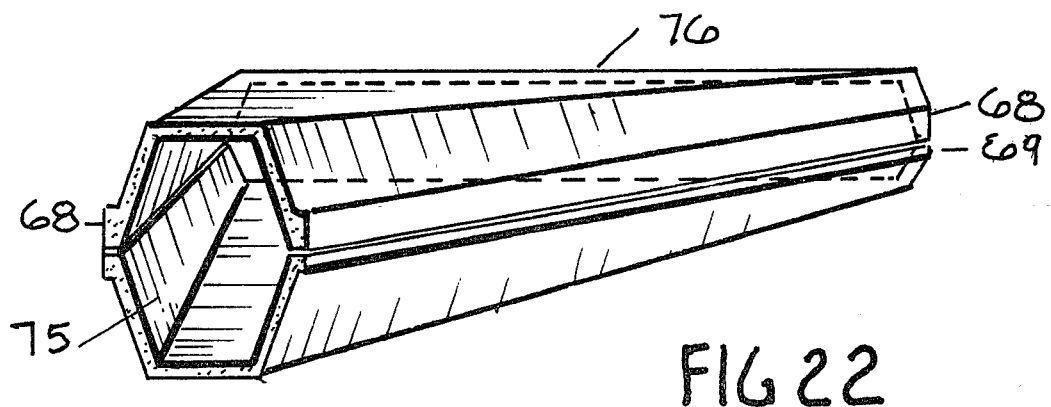

METHOD OF SITE CASTING TUNNELS, CULVERTS, PRESSURE PIPES WITH MINIMUM FORMING

BACKGROUND

Culverts, tunnels and pressure pipes for water supplies, storm water and sewers have been constructed by many different methods and with many different materials. The specific designs have been adjusted to suit local needs, site conditions, labor supply and the amount of work to be constructed. Among the methods in use today are included those of formed and cast-in-place, various precast methods, concrete pipe, metal pipe and extruded methods over mandrals. Patents such as Keller U.S. Pat. Nos. 4,075,300, 1978 and Collins 1,784,271 and McNeil 4,106,400, illustrate the current state of such art. The present method disclosed is new and unique and to the best of the petitioner's knowledge, is not known to contractors specializing in such construction.

SUMMARY OF THE INVENTION

The preferred method of the present invention is to neatly excavate the trench to receive the structure, to cast in situ the lower portion of the proposed structure including bottom and lower half of side walls; to treat this lower portion with a bond breaker membrane or other parting compound, and utilize it as a form for casting the upper portion of the structure in an inverted position. The upper portion is divided into modular lengths: then lifting such modules in sequence and turning them over and lowering them onto and sealing them to the lower portion of the structure. The present method provides that the bearing surfaces between the upper and lower portions of the structure be formed and cast directly above each other so that when the upper portion is lifted and turned over, support for the upper portion will be provided by the lower portion; and that the edge side walls of upper and lower portions along each side of the structure be located in planes parallel to each other. Generally, the planes would be parallel to the bottom of the structure.

The angle of slope of the side walls of the lower portion may be any slope required; the most practical slope would be less than one to one or 45°, this being the steepest slope that concrete of a slump of 1 to 3" can be poured without backforming. For steeper than one to one walls, blown concrete may be used.

The basic requirements for the present invention are that the upper portion as cast be capable of being lifted out from the form provided by the lower portion; and that the edges of top and bottom side walls be so cast that the upper portion will be supported by the lower portion in the erected position, and that the joinery provides for a structural and fluid tight requirement for the designed use.

Advantages of the present system are many and include the following:

1. Requires a minimum of excavation.
2. Requires a minimum amount of form work; the only form being required is along the upper edges of the walls as cast, and the cut-off forms dividing the upper portion into modules whose weights are within the lifting capacity of the equipment being used.
3. Requires a minimum amount of steel and concrete since the shape can be adjusted to the most efficient section to meet the loading requirements.
4. Provides a continuous monolithic bottom with sidewalls and eliminates the problem or sealing joints in lower half of the structure.
5. Requires no special equipment for erection.
6. Provides a design flexibility to vary structure size and shape continuously.
7. Reduces construction space requirements for men and equipment.
8. Permits construction of curves, bends, transitions of section from deep and narrow sections to wide and shallow sections.
9. Eliminates any problems of joining modules together since matching edges are formed and cast against common forms.
10. Permits placing gaskets and seals in position as the structure is erected thus utilizing the weight of the upper portion to assist in sealing the parts together.
11. Requires a minimum of skilled labor to produce an excellent product.
12. Permits easy visual supervision and inspection of all the parts as they are cast and as they are incorporated into the finished product.
13. Permits fast construction since large crews of men can work efficiently along the entire length of the structure with no interference. It would be possible to have crews working along the entire length of the structure at the same time to bring the entire structure to early completion with the assurance that all parts would fit together.
14. Permits incorporation of additional support walls where heavy loads are encountered as at bridges.
15. Permits use of post tension reinforcing, both longwise and around circumference of structure.
16. Accomodates any required degree of required reinforcement for a pressure pipe.
17. Ability to be used on large sections, as well as relatively small structures.

Additional advantages will be revealed in the drawings.

GENERAL DESCRIPTION OF DRAWINGS

FIGS. 10, 11 and 12 show alternate division forms for dividing upper portion of structure into modules.

FIG. 13 shows one method of the joining of upper and lower portions of structure have post tensioned reinforcing.

FIG. 14 shows the upper portion of the structure supported on the ground independent structurally from the lower portion of the structure.

FIG. 15 shows another profile for the edge joint.

FIG. 16 shows a pivot connection between edges of upper and lower portions of structure.

FIG. 17 shows hole and closure cast into upper portion of structure.

FIG. 18 shows edge of wall of upper portion bearing on face of wall of lower section.

FIG. 19 shows a "V" type cross section.

FIG. 20 shows a section of an opening with a pendant type supporting wall in horizontal cast position.

FIG. 21 shows section of FIG. 20 erected.

FIG. 22 shows a structure with transition from high narrow section to wide low section.

FIG. 23 shows plan of a double curve structure.

FIG. 24 shows perspective of curved structure as cast and erected.

DETAILED DESCRIPTION OF DRAWINGS

Figure 1:
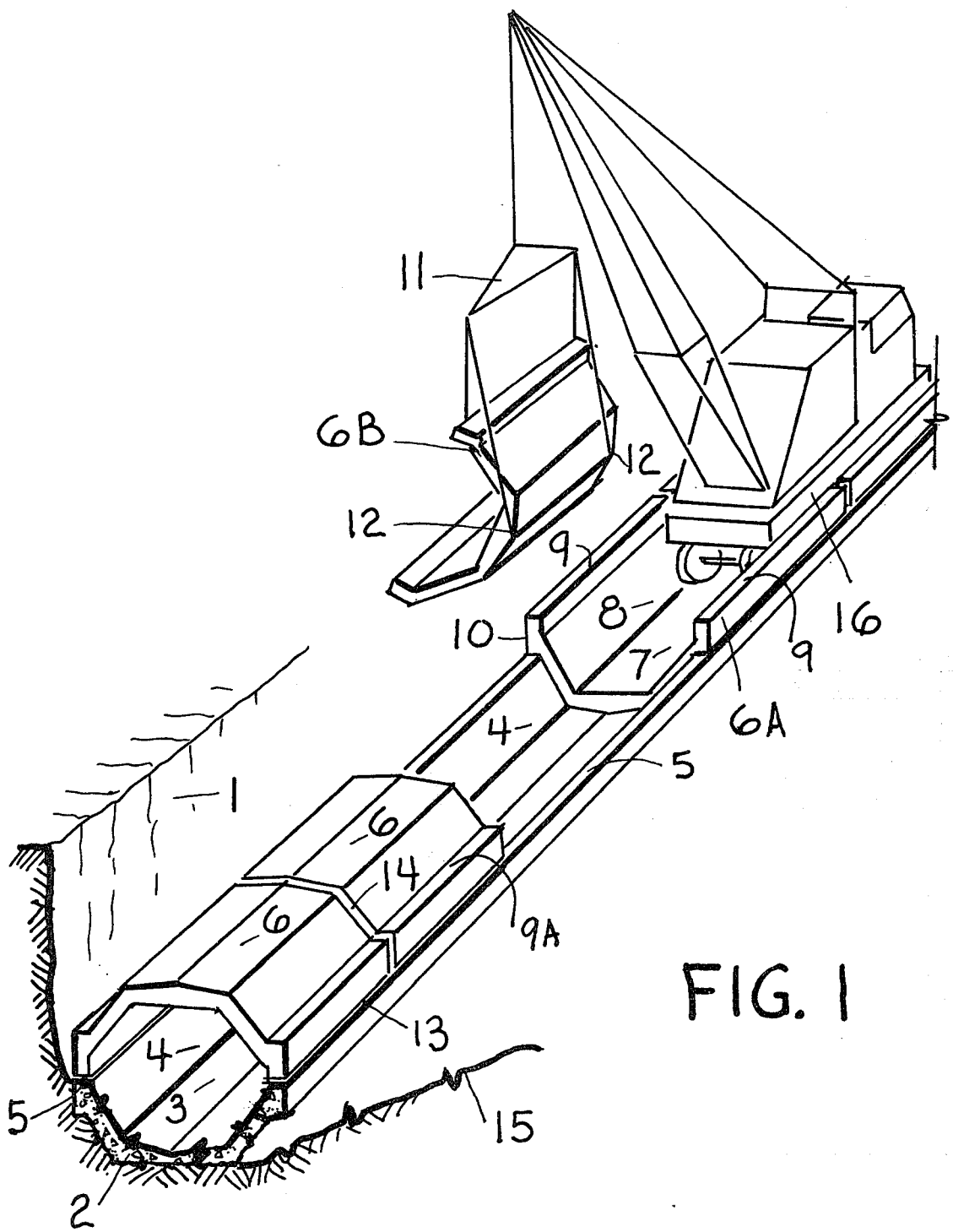
FIG. 1 is overall view of the method applied to a culvert structure.

FIG. 1 illustrates a typical application of the present method to the construction of a culvert in which the excavation 1 has been made as steep as the material would stand—the near side 15 of the excavation is shown removed in the drawing, but would be as steep as 1 in the typical construction. The bottom of the trench is excavated neatly and therein the bottom portion 2 of the culvert is cast as a continuous element including bottom 3 and side walls 4. The edge 5 is formed and finished to a true line.

After applying a bond breaker over the upper surfaces 3, 4 of this cast portion, a series of modular lengths 6A are formed and cast, with the edge surface 9 cast parallel to and overlying surface 5. A crane 16, driving on the surface 7, which forms a roadbed, is shown lifting and inverting a module 6B, which will be lowered onto wall surfaces 5 and be positioned against modules 6 shown in the erected position. Prior to lifting, it is possible to cover surfaces 7, 8 with various protective coatings. It is noted that surfaces 9 and 9A are in vertical and horizontal alignment and these may be used as a track from which special lifting equipment could be operated; surface 5 may be prepared with a grout bed or various types of gaskets be installed concurrent with placing the modules.

FIG. 1 illustrates a lifting rig that utilizes a spreader bar 11 and lifting cables attached to permit turning the unit over about a longitudinal axis.

An alternate method of lifting and inverting may be utilized in which the end of a module nearest the lifting equipment is lifted and then turned over end for end. This second method would be desireable in deep narrow excavating and might utilize pivot type connections (FIG. 16) placed at the end of the module, to provide precise control.

FIG. 1 shows a side wall sloping at a one-to-one slope which is as steep as concrete can be poured (with a 1" to 3" slump). A steeper wall may be achieved with backforming or use of blown concrete. It is generally desireable to have the walls 4 sloping outward at least 2° to facilitate lifting the upper portion out of the lower portion of the structure. The modules 6 are here shown to be of a thickness to function as structural elements as cast. An alternate application would be to cast them thinner and use them as a form in the erected position. The advantage of this would be to permit longer modules (by reducing the weight per lineal foot).

It is also apparent in FIG. 1 that the height of side 10 can be varied to increase the height of the culvert while maintaining the same horizontal dimensions of the culvert. This permits increasing capacity within a uniform width of excavation.

Figure 2:
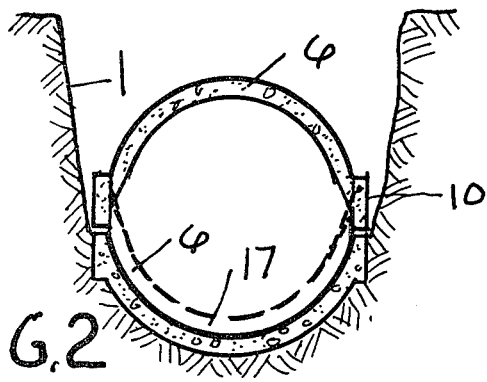
FIG. 2 shows cross section of a structure modified to approach a circular section.

In FIG. 2 is shown a structure with a round bottom and an arched top. The height of face 10 is a variable but should be sufficient to provide adequate thickness on the supporting edge. The dotted line indicates the cast position of the upper portion of the structure.

Figure 3:
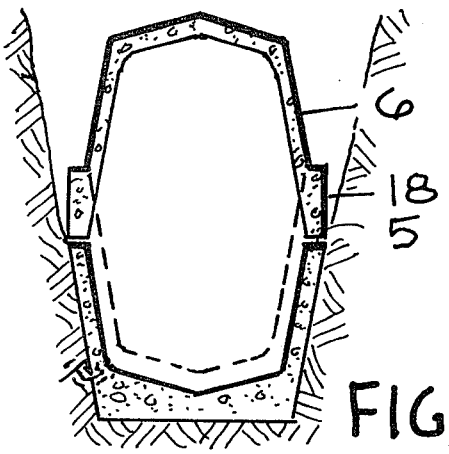
FIG. 3 shows cross section of structure with steep side walls.

In FIG. 3 the lower portion is shown cast against a neat excavation, with steep walls that would require blown concrete or backforming. It would also be possible to form and construct these slopes with a moving form piece of equipment operating like a paving machine along the excavation. In this figure the important feature to note is that surface 9 as cast will bear, when erected, on surface 5, and therefore, should be carefully formed. It is possible to cover 5 with a grout bed before placing 9 to cushion 9 and seal the joint; or it might be desireable to finish 9 as cast so that only the ends of the edges of the modules actually rest on 5 when erected thus giving additional tolerance to the forming units. It is noted that casting the upper portion against the shaped invert of the lower portion automatically gives an "arch" shape to the top of the culvert; and also that the intersection of the top and the side walls can be "eased" to provide additional strength at these corners.

Referring again to FIG. 1, it should be noted that the surfaces at joint 14 are actually cast against a common divider form so that a 100% mating of the erected modules is assured.

Figure 4:
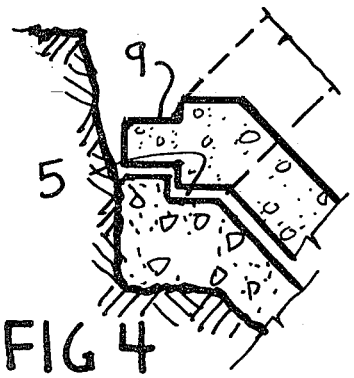
FIGS. 4 and 5 show two different profiles for edges of lower and upper portions of structure.

The next FIG. 4 illustrates one of the various profiles that may be used for the edges of the walls, here shown solid in cast position. In FIG. 4 it would be critical to have the vertical edges within the joint formed accurately to assure a proper fit.

Figure 5:
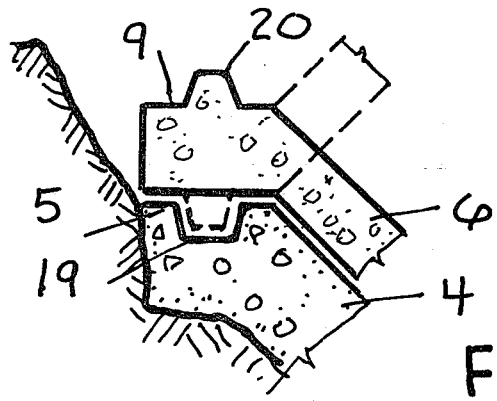

In FIG. 5 a profile with a tongue and groove is shown and again, this would require a more precise forming. A gasket placed in notch 19 would provide the seal.

Figure 6:
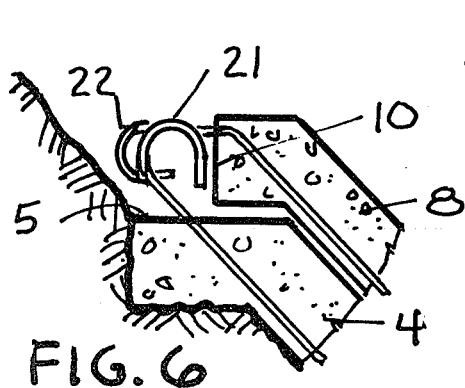
FIGS. 6 and 7 show one method of providing structural continuity at edges.
Figure 7:
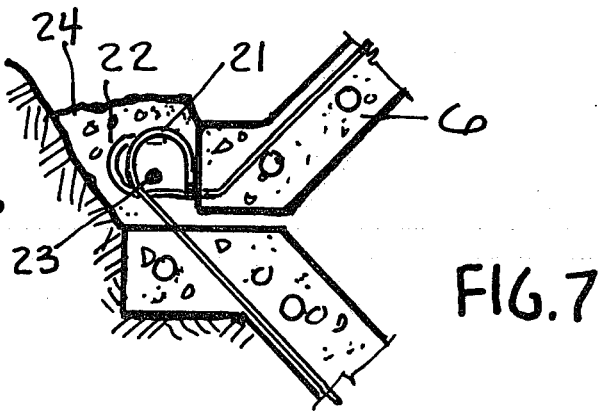

Continuing to FIGS. 6 and 7 FIG. 6 shows the lower and upper portions with reinforcing steel 21, 22 extending from both edges. These bars would be spaced at the same intervals for both sides of the structure and generally, if the bars were required at 6" spacing, the bars from the lower portion would be at a cadence of 3", 9", 15",21" etc., and the bars from the upper portion spaced at a cadence of 0", 6", k2", 18" etc. This spacing would assure that the bars would not interfere with each other when the modules are lowered into position. Longitudinal steel as bar 23, can be most easily placed at the time of forming, in the module adjacent to the one being lifted, and once the module is in position, sliding it forward for the erected module simultaneously freeing the steel for the next module to be lifted. Alternate methods such as bolting, welding etc. Come readily to mind for the constructor and for assurance of success, require only that the spaces of anchors be coordinated along both sides for the length of the structure.

Figure 8:
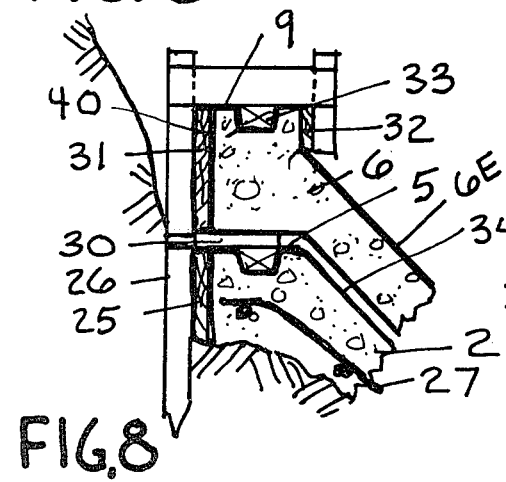
FIG. 8 shows typical forms for constructing edges.

In FIG. 8, one possible method of edge forming is suggested in which form 25 provides a control for the alignment of edge 5; 26 is a stake. A form 31 of constant width thus installed would assure a surface 9 that would match surface 5. This FIG. 8 shows an edge from 32 that would be optional and has been eliminated in producing the edge FIG. 9. Surface 34 would be covered with a bondbreaker, membrane, or panel to assure no sticking of the cast section 6. In addition, surface 34 and 6E could be treated with a heavy coating, or even tiled in the cast position, thus providing an additional advantage to this method of construction. Keyway 33 would provide a groove for a gasket.

Figure 9:
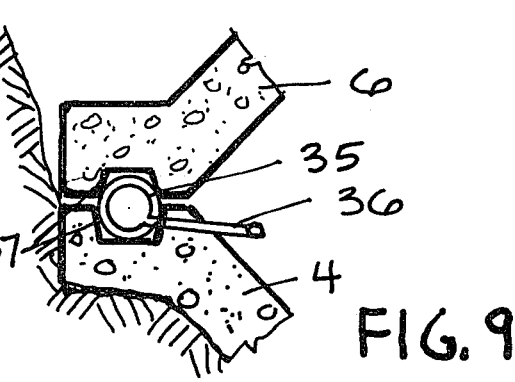
FIG. 9 shows one method for placing a basket seal.

In FIG. 9 there is shown a hollow tube-like gasket 35 with a filler tube 36 extending into the culvert. It would be installed so that fluid from the culvert or pipe would force the seal tight against the keyway wall 37. An alternate method would be to have a long, continuous seal 35 that would be pressurized to a greater pressure than the pipe useage would generate. It is intended that various mechanical means would be used in combination with the FIG. 9 to meet the structural design requirements, including bolting, welded clips and the like.

In FIG. 10 is shown one type of form to divide the upper portion of the structure into modular lengths. It is noted that the notch formed by 38 would be open for grout in the erected position and the modules 6 be erected against a spacer equal in thickness to 39 and this thickness would be coordinated with the size of a gasket which would be placed prior to grouting 38. Again it is noted that both modules are cast against a common form 39 so that a proper mating is assured in the erected position.

In FIG. 11 a joint is illustrated to produce a lap type joinery. This joint would require casting a module offset by the width of the lap and based upon lifting the left hand module first, would permit successive modules to be lowered and sealed progressively. A gasket may be provided between the surfaces in groove 44.

In FIG. 12 a more elaborate dividing form is shown. This form provides a notch into which steel reinforcing 47, 48 extends from adjacent modules. These may be protected with sand or another form during the casting operation, and then grouted together in the erected position. Edge form 49 and keyways 50 provide a space for a gasket.

In FIG. 13 is shown a simple edge condition. It is noted that the actual bearing of 9 on 5 is reduced to a minimum and provides a clear exposure for post tensioning steel 51 and pigtail extensions 53 are embedded in grout. The plugs 52 operate with the post tensioned steel. Grout 54 may be of an expansive type to add to the value of the joint, and additional steel may be added as desired.

In FIG. 14 is shown a condition where module 6 is cast and erected with face 9 above and clear of surfaces 5. Surface 9 is supported directly on the excavation to avoid transmitting any vibration to portion 2. A gasket 19A inserted between the two portions, seals the joint.

In FIG. 15 is shown an edge detail with form 58 separating the first and second portions. After lifting and inverting 8, and lowering 9 onto 5, the space 58 can be filled with grout to seal and secure the joint. Surface 57 can be formed with additional horizontal grooves if desired for more shear strength.

In FIG. 16 a vertical longitudinal section is shown through the edge of wall 4 and module 6. A flat plate 60 with a slotted hole 63 is anchored into 4. A slot is provided in 6 with clearance to plate 60. A pin 62 serves as a pivot and lifting module 6 around a pair of these connections (one on each side of structure) permits a controlled rotation of the module end over end. This would have an advantage for a narrow trench and would minimizes any chance of chipping edges during erection. The flat plate could be replaced with a bendable strap or alternate means of controlling the module 6 as lifted and rotated.

In FIG. 17 is disclosed a section through slab 6 to provide an opening with cast in place closure 69 and means of securing 69 with brace 67 and tie wire 68 until the slab 6 is lifted and inverted. This permits inspection openings, and the like to be incorporated during the construction and eliminate the problems normally associated with fitting and incorporating them in traditional methods of construction.

In FIG. 18 a section is shown to minimize edge forming still further. Edge 9 bearing on 5 provides support for 6. The portion of the structure can be of any desired sectional profile.

In FIG. 19 a "V" sloped structure is disclosed. Note section 6D where slab of upper portion 6 is made thicker to provide additional strength; and note that this is accomplished without requiring any special forming.

In FIGS. 20 and 21 is shown a method of providing an interior supporting wall 70 with a metal hanging means 71 and pivot 72, 73 at each end to articulate the wall from cast position to erected position. This would have application in constructing a bridge by virtue of reducing the span of the top.

Note that this section could be used for a bomb shelter by forming it symmetrically in a longitudinal section to that shown. Additionally, openings as 69 could be provided to assure access to such a shelter. In addition, a panel 70 could be cast with the same profile as interior surface cross section of structure and this could be lifted and pivoted to form a longitudinal cut-off wall in a structure.

In the usual construction for a bridge panel 70, would be parallel to fluid current. The edges of 70 could be rounded or otherwise streamlined and panel 70 could have lightening holes or arches opening. Slab 6 can be divided alongside wall 70 to reduce size and weight of module.

In FIG. 22, one method is disclosed where a transition is made from a high narrow section 75 to a wide shallow section 76. Edge 68 does not require any special form for the transition. It is important that the ends of modules of the unit be parallel and that they be at right angles to the axis of the structure to assure a fit at each end. The unit must be rotated about the long axis for erection.

FIG. 23 discloses a double curve in the cast position. Each segment 77, 78 is formed around a constant radius for the length of the arc, and the end planes pass through the vertical axis of radius and the point of tangency of a change in direction. Note that modular segments are rotated end for end. Note also that additional division plane as 80 may be added and preferably pass through the exis of radius.

In FIG. 24 is shown a simplified perspective of several segments of a curved structure on various positions as cast, lifted and inverted, and in erected position. Corner 81, 87, 83, 84 are identified to clarify manner of lifting and positioning.

Figure 25:
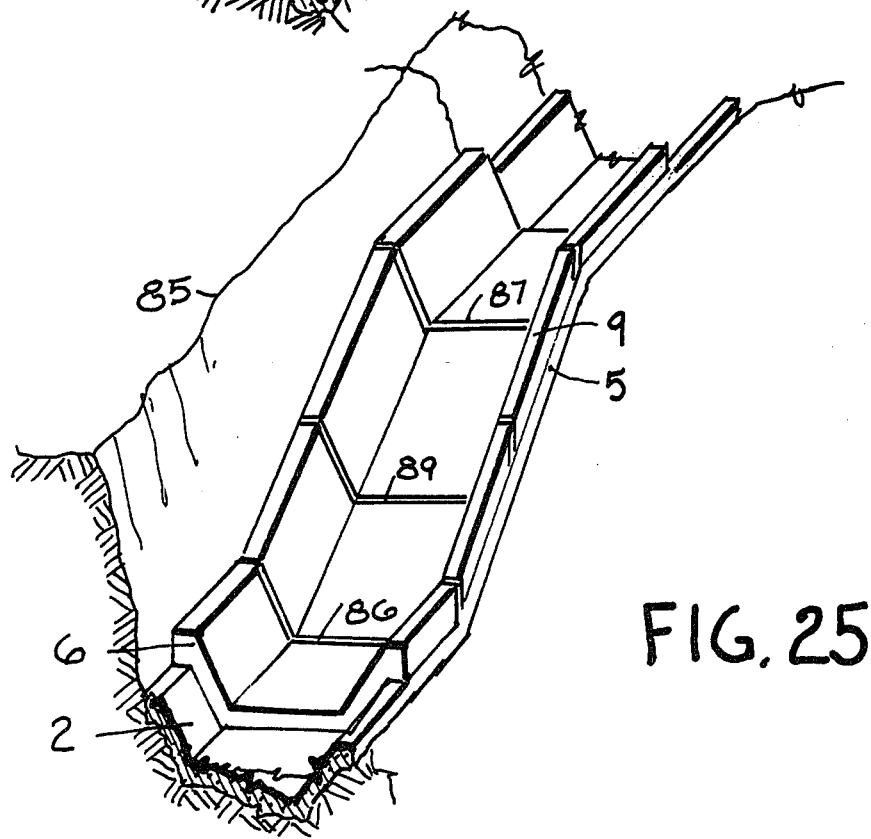

FIG. 25 illustrates a structure in the cast position traversing a steep bank 85 with lower portion 2 and an upper portion 6. Division lines 86, 87 are in planes perpendicular to the structure extensions at each end of the sloping section. Division, such as 89 can be as many as desired and, based upon a rotating of the modules in a longitudinal manner, modules will fit perfectly as long as the plane of the module division is perpendicular to the axis of the sloping section where the division line is located.

Lifting the upper portion modules so that line 86 is relocated to the top end of the sloping section and 87 is relocated to the bottom end of sloping section causes the top casting to mate perfectly at the change in direction of the structure. Where the section of structure between the top and bottom transitions is long and straight, the intermediate modules can be rotated around the longitudinal axis of the structure if desired.

In addition, serrations can be formed in the edges of the side walls of the upper and lower portions of the structure and when the upper portion of the structure is in position, the serrated edges will engage each other and resist sliding of the upper portion downward.

Figure 26:
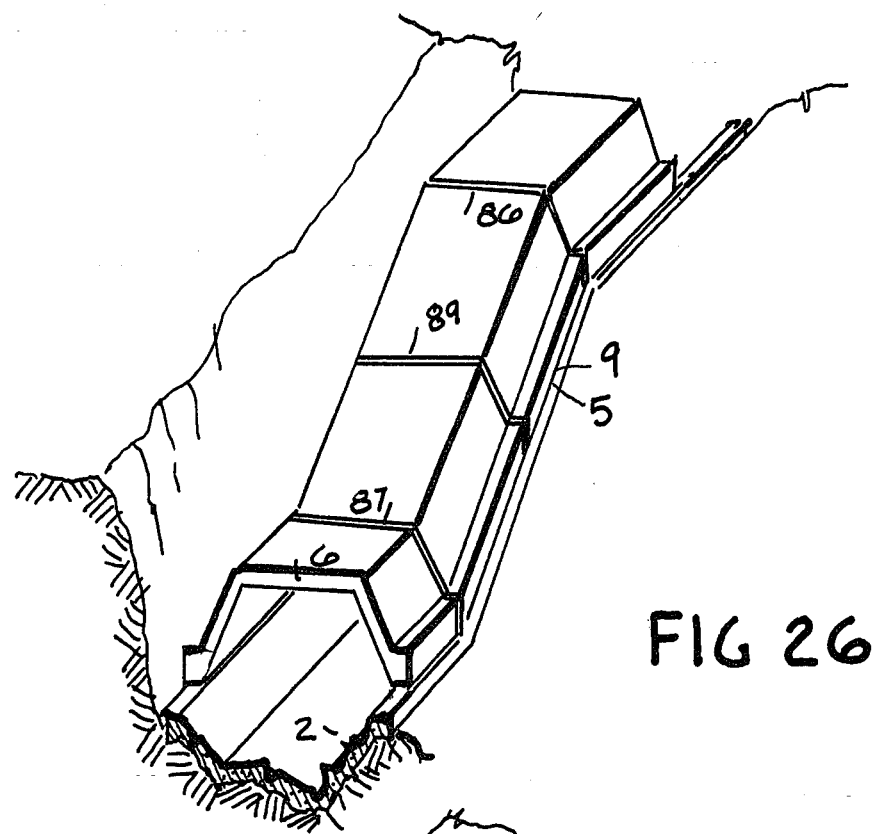
FIGS. 25 and 26 show a structure traversing a steep bank as for a penstock.

FIG. 26 shows the structure of FIG. 25 in the erected position.

In summary, it is believed that a useful, practical and economical method for constructing structures such as tunnels, culverts, pressure pipes, shelters, has been disclosed, and it is believed that the method is not now known or in practice. The disclosed method of construction permits the construction of any size or shape of structure where the upper portion is substantially symmetrical with the lower portion, and the upper portion can be subdivided into modules within the lifting capabilities of the equipment.

Substantial savings in labor, transportation, time, forming, excavation, supervision and inspection can be achieved and these savings will result in total savings cost. The structure according to this method can be constructed of presently used material as concrete, plastic, shreaded wood products, asbestos cement, and various combinations of these.

While particular embodiments of the present invention have been disclosed and shown in detail, it is apparent that other adaptations and modifications will occur to these skilled in the art, which adaptations and modifications are within the scope of the present invention as set forth in the claims.

I claim:

1. Methods of constructing a hollow structure in situ, comprising the steps of first casting a material to form a lower portion of the structure, said portion comprising a bottom and walls extending upward from said bottom, and; utilizing this first portion of the structure as a mold, casting therein a material to form a second portion, said second portion comprising a second bottom and walls extending upward from said second bottom; and lifting said second portion of the structure from said first portion; and inverting said second portion, and; lowering said second portion onto said first portion, position lower edges of walls of said second portion in position to support second portion of structure over said first portion of structure.

2. According to claim 1, with added step of casting walls of first portion of structure against exterior forms.

3. According to claim 1, with added step of casting first portion of structure in a neat excavation.

4. According to claim 1, with added step of casting second portion within and extending over top edges of walls of said first portion.

5. According to claim 1, wherein upper edge surfaces of walls of lower portion and edge surfaces of walls of upper portion in cast position are formed and cast true and parallel to common lines and planes and said support of second portion over said first portion comprises a continuous contact support.

6. According to claim 5 wherein said edge surfaces are formed and constructed to mating profiles and said surfaces fit together in the erected position.

7. According to claim 5 with added step of providing a gasket between all joints of structure.

8. According to claim 1 with added step of adding division forms for second portion of structure, said division forms dividing said second portion into modules weighing less than lifting capacity of equipment used; each of said modules comprising a portion of bottom and walls of said second portion, said modules being erected sequentially to form upper portion of said structures.

9. According to claim 9, with the additional steps of providing conduit for post tensioned steel in said module and the added step of installing and post tensioned steel in said conduit in erected position.

10. According to claim 1, with the additional step of providing conduit for post tensioned steel in at least first and second portions of structure and installing said post tensioned steel secures said second portion of said structure.

11. According to claim 1, with added step of casting a third portion, said third portion comprising at least one wall panel cast horizontally over lying said second bottom of said second portion in cast position, and one edge of said panel hingeably connected to said second bottom, and step of lifting said second portion and inverting said second portion causes gravity to cause said wall to depend to a vertical position and lowering said second portion onto said first portion brings lower edge of said panel to support on bottom of said first portion of structure.

12. According to claim 1, with the added step of casting over the second portion in its erected position, additional material comprising structural reinforcing for said second portion of structure, said second portion comprising a form for said additional material.

13. According to claim 1 wherein said support comprises lower edge of walls of said upper portion of structure supporting on inner face of walls of said lower portion of structure.

14. According to claim 1 wherein said structure comprises an elongated open ended structure.

15. According to claim 1 wherein said structure comprises an elongated open-ended structure disposed around a generally horizontal circular arc, and, second portion of said structure divided into segments at end points of tangency of said arc, and lifting, inverting and lowering said upper segments at end points of tangency of said arc; and lifting, inverting and lowering said upper segments includes interchanging ends of said upper segment.

16. According to claim 1 wherein said structure comprises an elongated open ended structure, said structure disposed over a vertical curve, said upper portion being divided into segment at points of tangency of said curve and lifting and inverting said upper portion which includes interchanging segments of second portion cast curving upward with segments of second portion cast curving downward.

17. A method according to claim 1 with the added step of forming an opening within second portion of the structure, edge form for said opening comprising a thin dividing form sloping outward from inner surface of upper portion as cast, and casting said upper portion includes casting upper portion within said form, and said portion cast within said form comprises a closure for said opening in the erected position.

18. According to claim 1 with the added step of placing bed of grout over upper surface of walls of said first portion of structure, and lowering second portion of structure comprises bedding lower edges of second portion into said bed of grout.

19. According to claim 1 wherein upper part of side walls of first portion are cast offset outwardly, and outer surface of side walls of second portion are cast to conform in shape to said offset.

20. According to claim 19 wherein upper portion of side walls of said upper portion of structure is cast as a vertical wall above horizontal surface top edge of side walls of first portion, and said upper side wall comprises a track for lifting equipment.

21. According to claim 1 wherein bottom of second portion as cast comprises a roadbed supporting lifting equipment during erection.

22. According to claim 1 with added step of forming a recess in inner surface of first and second portion alongside all joints, and added step of sealing all of said joints with a mat or tape in said recess.

23. According to claim 1 wherein said materials comprise concrete.

24. According to claim 1 wherein said material comprises a reinforced concrete.

25. According to claim 8 wherein said division form comprises a form to produce an overlapping of adjacent modules, and lifting said modules sequentially includes sliding a module horizontally.

26. According to claim 1 wherein said inverting of said upper portion comprises an axial rotation of said second portion.

27. According to claim 1 wherein said inverting comprises additional step of rotating 180° in horizontal plane.

28. According to claim 8 wherein gaskets are incorporated between all joints between said modules.

29. A method of constructing a hollow structure utilizing an existing open-top structure as a mold, said existing structure comprising a bottom and at least two outwardly sloping side walls, casting therein a material to form a new portion of said structure, said new portion comprising a bottom and side walls extending upward and against said side walls of said existing structure; and lifting said new portion of the structure from said existing portion, and inverting said new portion, and lowering said new portion onto said existing portion, and supporting lower edges of side walls of said new portion on side walls of said existing structure.

30. A method according to claim 1 with the added step of applying a ceramic type coating to the upper surface of the said second portion of the structure while said portion is in the cast position; and the additional step of, after said second portion of said structure has been lifted, inverted and lowered onto said first portion of said structure, securing said second portion of structure to said first portion of structure; and the additional step of applying a ceramic type coating to the upper surface of bottom and side walls of said first portion of said structure, said ceramic coating being extended to lap onto said ceramic coating on said second portion of said structure and joints between sections of second portion of said structure.

31. A method according to claim 1 with the added step of applying an acid resistant coating to the upper surface of the said second portion of the structure while said portion is in the cast position; and the additional step of, after said second portion of said structure has been lifted, inverted and lowered onto said first portion of said structure, securing said second portion of structure to said first portion of structure; and the additional step of applying an acid resistant type coating to the upper surface of bottom and side walls of said first portion of said structure, said acid resistant coating being extended to lap onto said acid resistant coating on said second portion of said structure and joints between sections of second portion of said structure.

32. A method according to claim 1 with the added step of applying a flexible type coating to the upper surface of the said second portion of the structure while said portion is in the cast position; and the additional step of, after said second portion of said structure has been lifted, inverted and lowered onto said first portion of said structure, securing said second portion of structure to said first portion of structure; and the additional step of applying a flexible type coating to the upper surface of bottom and side walls of said first portion of said structure, said flexible coating being extended to lap onto said fexible coating on said second portion of said structure and joints between sections of second portion of said structure.

33. A method according to claim 1 wherein said first and second portions of said structure are cast with reinforcing steel within the thickness of said portions of said structure, said reinforcing bars extending continuously from edge to edge of each portion of said structure, and ends of said reinforcing bars are exposed along said edges, and after said second portion of structure has been lifted, inverted and lowered onto said first portion of said structure, exposed ends of said reinforcing bars from lower portion of said structure are secured to exposed ends of reinforcing bars extending from upper portion of said structure, and joint between said first and second portion of said structure is grouted tight.

34. A method of constructing a hollow structure comprising the steps of first forming a material to comprise a lower portion of the structure, said portion comprising a bottom and at least two walls extending upward and outward from said bottom, and distance between upper ends of said side walls is greater than distance between said side walls at the intersection of said side walls and said bottom; and utilizing this lower portion of the structure as a mold, forming therein a material to form a second portion, said second portion comprising a bottom and walls extending upward from said bottom, and said walls formed against side walls of said lower portion: And lifting said second portion from said lower portion, and inverting said second portion, and lowering said second portion onto said lower portion, positioning lower edges of walls of second portion in position to support second portion over lower portion of said structure, and securing said second portion to said lower portion.

* * * * *